United States Patent
Li et al.

(10) Patent No.: US 11,436,419 B2
(45) Date of Patent: Sep. 6, 2022

(54) BILINGUAL CORPORA SCREENING METHOD AND APPARATUS, AND STORAGE MEDIUM

(71) Applicant: Beijing Xiaomi Mobile Software Co., Ltd., Beijing (CN)

(72) Inventors: Jingwei Li, Beijing (CN); Yuhui Sun, Beijing (CN); Xiang Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 4 days.

(21) Appl. No.: 16/891,705

(22) Filed: Jun. 3, 2020

(65) Prior Publication Data

US 2021/0182503 A1   Jun. 17, 2021

(30) Foreign Application Priority Data

Dec. 11, 2019   (CN) .......................... 201911269664.7

(51) Int. Cl.
| | |
|---|---|
| G06F 40/58 | (2020.01) |
| G06F 40/51 | (2020.01) |
| G06F 40/44 | (2020.01) |
| G06F 40/263 | (2020.01) |
| G06N 3/08 | (2006.01) |

(52) U.S. Cl.
CPC ............ G06F 40/58 (2020.01); G06F 40/263 (2020.01); G06F 40/44 (2020.01); G06F 40/51 (2020.01); G06N 3/08 (2013.01)

(58) Field of Classification Search
CPC ........ G06F 40/58; G06F 40/263; G06F 40/44; G06F 40/51; G06F 40/45; G06F 40/30; G06N 3/08; G06N 3/0454; G06N 3/0472; G06N 3/088

USPC .............................................................. 704/2
See application file for complete search history.

(56) References Cited

FOREIGN PATENT DOCUMENTS

JP   6606243 B2   11/2019

OTHER PUBLICATIONS

NICT's Corpus Filtering Systems for the WMT18 Parallel Corpus Filtering Task. Wang et al. Sep. 19, 2018. 5 pages.*
Extended European search report of counterpart EP Application No. 20185703.4 dated Jan. 13, 2021.
Guillaume Lample, et al., Unsupervised Machine Translation Using Monolingual Corpora Only, ICLR, Apr. 13, 2018, 14 pages.

(Continued)

*Primary Examiner* — Thierry L Pham
(74) *Attorney, Agent, or Firm* — Finnegan, Henderson, Farabow, Garrett & Dunner, L.L.P.

(57) ABSTRACT

A bilingual corpora screening method includes: acquiring multiple pairs of bilingual corpora, wherein each pair of the bilingual corpora comprises a source corpus and a target corpus; training a machine translation model based on the multiple pairs of bilingual corpora; obtaining a first feature of each pair of bilingual corpora based on the trained machine translation model; training a language model based on the multiple pairs of bilingual corpora; obtaining feature vectors of each pair of bilingual corpora and determining a second feature of each pair of bilingual corpora based on the trained language model; determining a quality value of each pair of bilingual corpora according to the first feature and the second feature of each pair of bilingual corpora; and screening each pair of bilingual corpora according to the quality value of each pair of bilingual corpora.

20 Claims, 6 Drawing Sheets

(56) References Cited

OTHER PUBLICATIONS

Rui Wang et al., NICT's Corpus Filtering Systems for the WMT18 Parallel Corpus Filtering Task, National Institute of Information and Communications Technology, Sep. 19, 2018, 5 pages.

Anonymous, Autoencoder, Dec. 8, 2019, 12 pages.

Yuhui Sun et al., Xiaomi's Submissions for IWSLT 2020 Open Domain Translation Task, Proceedings of the 17th International Conference on Spoken Language Translation (IWSLT), Jul. 9, 2020, pp. 149-157.

Philipp Koehn et al., Findings of the WMT 2018 Shared Task on Parallel Corpus Filtering, Proceedings of the Third Conference on Machine Translation (WMT), Oct. 31, 2018, pp. 739-752.

Nick Rossenbach et al., The RWTH Aachen University Filtering System for the WMT 2018 Parallel Corpus Filtering Task, Proceedings of the Third Conference on Machine Translation (WMT), vol. 2: Shared Task Papers, Oct. 31, 2018, pp. 959-967.

Written Decision on Registration of Korean Application No. 10-2020-0085174 dated Apr. 23, 2022.

Chanjun Park et al., A Study on the Performance Improvement of Machine Translation Using Public Korean-English Parallel Corpus, Journal of Digital Convergence, vol. 18. No. 6, pp. 271-277, Jun. 28, 2020.

Viktor Hangya et al., An Unsupervised System for Parallel Corpus Filtering, Proceedings of the Third Conference on Machine Translation (WMT), vol. 2, pp. 895-900, Brussels, Belgium, Oct. 31-Nov. 1, 2018.

\* cited by examiner

BILINGUAL CORPORA SCREENING METHOD AND APPARATUS, AND STORAGE MEDIUM

CROSS-REFERENCE TO RELATED APPLICATION

The present application is based on and claims priority to Chinese Patent Application No. 201911269664.7 filed on Dec. 11, 2019, the entire content of which is incorporated herein by reference.

TECHNICAL FIELD

The present disclosure relates to the field of neural machine translation technologies, and more particularly to a bilingual corpora screening method, apparatus, and a storage medium.

BACKGROUND

Conventionally, a large number of corpora are needed to train a model in the field of neural machine translation. As corpus quality has a great effect on the quality of the model, maintenance of the corpus quality by cleaning the corpora is particularly important.

Currently, corpus cleaning methods are mainly dependent on artificial rules or based on statistical results. The method dependent on the artificial rules mainly carries out targeted filtering through regular expressions according to problems already found in the corpus, or carries out filtering according to an encoding range of the corpus. The method based on the statistical results achieves the purpose of cleaning the corpus by counting a word frequency in the corpus and deleting the corpus containing low-frequency words.

However, based on the above two methods, the data volume of the corpora involved in the filtering and cleaning is limited. As a result, the corpus is cleaned only for a specific situation, which may affect the data volume of the cleaned or filtered corpora and reduce the efficiency in corpus cleaning.

SUMMARY

According to a first aspect of embodiments of the present disclosure, a bilingual corpora screening method includes: acquiring multiple pairs of bilingual corpora, wherein each pair of the bilingual corpora includes a source corpus and a target corpus; training a machine translation model based on the multiple pairs of bilingual corpora; obtaining a first feature of each pair of bilingual corpora based on the trained machine translation model; training a language model based on the multiple pairs of bilingual corpora; obtaining feature vectors of each pair of bilingual corpora and determining a second feature of each pair of bilingual corpora based on a trained language model; determining a quality value of each pair of bilingual corpora according to the first feature and the second feature of each pair of bilingual corpora; and screening each pair of bilingual corpora according to the quality value of each pair of bilingual corpora.

According to a second aspect of embodiments of the present disclosure, a bilingual corpora screening apparatus includes: a processor; and a memory for storing instructions executable by the processor, wherein the processor is configured to: acquire multiple pairs of bilingual corpora, wherein each pair of the bilingual corpora includes a source corpus and a target corpus; train a machine translation model based on the multiple pairs of bilingual corpora; obtain a first feature of each pair of bilingual corpora based on the trained machine translation model; train a language model based on the multiple pairs of bilingual corpora; obtain feature vectors of each pair of bilingual corpora and determine a second feature of each pair of bilingual corpora, based on the trained language model; determine a quality value of each pair of bilingual corpora according to the first feature and the second feature of each pair of bilingual corpora; and screen each pair of bilingual corpora according to the quality value of each pair of bilingual corpora.

According to a third aspect of embodiments of the present disclosure, a non-transitory computer-readable storage medium has stored therein instructions that, when executed by a processor of a device, cause the device to perform the bilingual corpora screening method according to the first aspect.

The technical solutions provided by embodiments of the present disclosure may include the following benefits.

First, multiple pairs of bilingual corpora are acquired, with each pair of the bilingual corpora including a source corpus and a target corpus; a machine translation model is trained based on the multiple pairs of bilingual corpora; a first feature of each pair of bilingual corpora is obtained based on the trained machine translation model; a language model is trained based on the multiple pairs of bilingual corpora; feature vectors of each pair of bilingual corpora are obtained and a second feature of each pair of bilingual corpora is determined based on the trained language model; then a quality value of each pair of bilingual corpora is determined according to the first feature and the second feature of each pair of bilingual corpora; and finally, each pair of bilingual corpora is screened according to the quality value of each pair of bilingual corpora. With the above solution, the features of each pair of bilingual corpora are acquired, the quality values of different pairs are comprehensively determined based on the features, and the bilingual corpora are screened according to the quality values. The bilingual corpora screening method is applicable to various pairs of bilingual corpora, and can avoid the problem of inability to filter and screen some bilingual corpora, increase the data volume of cleaning corpora, and improve the efficiency in bilingual corpora cleaning.

It is to be understood that both the foregoing general description and the following detailed description are exemplary only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
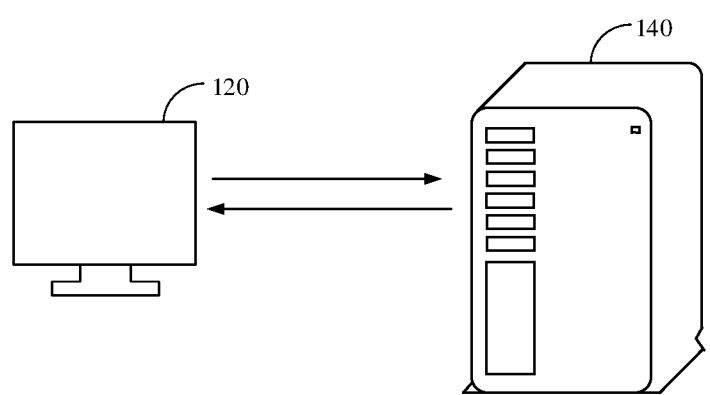
FIG. 1 shows a schematic diagram of an implementation environment according to an exemplary embodiment.

Reference will now be made in detail to exemplary embodiments, examples of which are illustrated in the accompanying drawings. Where the following description refers to the accompanying drawings, the same reference numerals in different drawings represent the same or similar elements, unless otherwise represented. The embodiments set forth in the following description are exemplary embodiments and do not represent all embodiments consistent with the present disclosure. Instead, these embodiments are merely examples of devices and methods consistent with some aspects related to the disclosure as recited in the appended claims.

FIG. 1 shows a schematic diagram of an implementation environment according to an exemplary embodiment. The implementation environment includes a computer device 120 and a server 140.

The computer device 120 is connected to the service 140 via a wired or wireless network.

The server 140 may be a standalone server, a server cluster formed by several servers, or a cloud computing center.

The server 140 may include a database storing bilingual corpora.

In some embodiments, the wired or wireless network adopts standard communication technologies and/or protocols. The network may be the Internet, and may also be any other network, including but not limited to any combination of a local area network (LAN), a metropolitan area network (MAN), a wide area network (WAN), a mobile network, a dedicated network, or a virtual dedicated network. In some embodiments, technologies and/or formats including the Hyper Text Mark-up Language (HTML), the Extensible Markup Language (XML), and the like are used to represent data exchanged via the network. In addition, conventional encryption technologies such as Secure Socket Layer (SSL), Transport Layer Security (TLS), Virtual Private Network (VPN), Internet Protocol Security (IPsec) and the like may be used to encrypt all or some links. In some embodiments, customized and/or dedicated data communication technologies may also be used in place of or in addition to the aforementioned data communication technologies.

Figure 2:
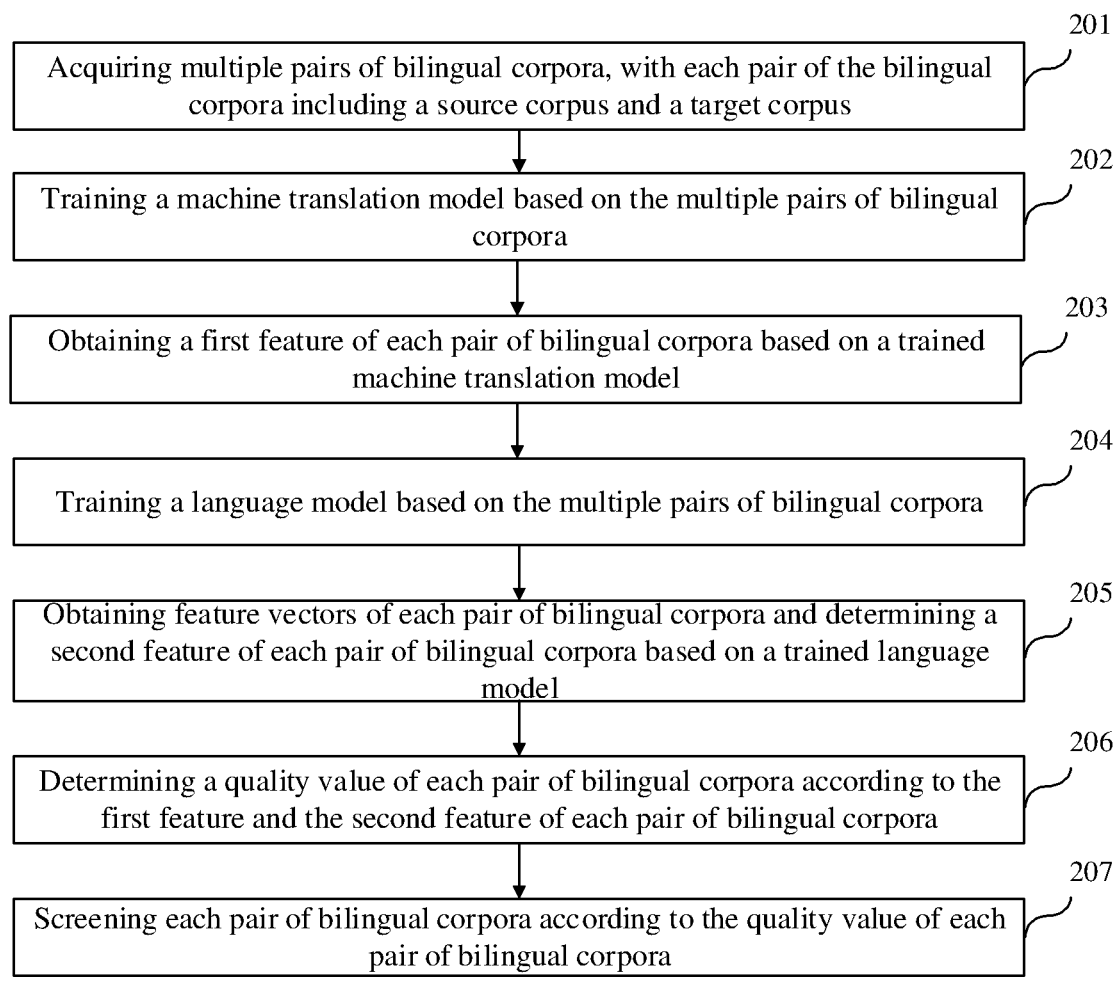
FIG. 2 shows a flowchart of a bilingual corpora screening method according to an exemplary embodiment.

FIG. 2 shows a flowchart of a bilingual corpora screening method according to an exemplary embodiment. The bilingual corpora screening method may be applied to a computer device. For example, the computer device may be the computer device 120 shown in FIG. 1. As shown in FIG. 2, the bilingual corpora screening method may include the following steps.

In step 201, multiple pairs of bilingual corpora are acquired, with each pair of the bilingual corpora including a source corpus and a target corpus.

In an embodiment, the bilingual corpora may be language materials stored in a bilingual corpora base, and may be word corpora, phrase materials, sentence materials or discourse materials. For example, the bilingual corpora base may be implemented in a database form, which is stored in a server or a cloud network.

In step 202, a machine translation model is trained based on the multiple pairs of bilingual corpora.

In an embodiment, the machine translation model is a machine learning model for translating one language into another language. The machine translation model is mainly a neural network model, which may be a neural machine translation model based on any architecture. For example, the machine translation model may be a neural machine translation model based on a recurrent neural networks (RNN) model, a convolutional neural network (CNN) model, or a TRANSFORMER model.

In step 203, a first feature of each pair of bilingual corpora is obtained based on a trained machine translation model.

In step 204, a language model is trained based on the multiple pairs of bilingual corpora.

In an embodiment, two language models may be prepared for the bilingual corpora. Each language model corresponds to the corpus of one language, and the two language models respectively aim at the source corpus and the target corpus. For example, the language model is to input the corpus of one language and then output another expression form of the corpus of the language as obtained by performing noise processing on the input corpus.

In step 205, feature vectors of each pair of bilingual corpora are obtained and a second feature of each pair of bilingual corpora is determined based on a trained language model.

In step 206, a quality value of each pair of bilingual corpora is determined according to the first feature and the second feature of each pair of bilingual corpora.

For example, the quality value represents the quality of corresponding bilingual corpora.

In step 207, each pair of bilingual corpora is screened according to the quality value of each pair of bilingual corpora.

In an embodiment, the machine translation model includes a first translation model and a second translation model, and each first feature includes a first probability feature and a second probability feature. That the first feature of each pair of bilingual corpora is obtained based on the trained machine translation model includes: inputting the source corpus in each pair of the bilingual corpora to a trained first translation model, and determining the first probability feature of the bilingual corpora based on a result output by the first translation model, wherein the first probability feature is a probability that the first translation model predicts the source corpus as the target corpus corresponding to the source corpus in the bilingual corpora; and inputting the target corpus in each pair of the bilingual corpora to a trained second translation model, and determining the second probability feature of the bilingual corpora based on a result output by the second translation model, wherein the second probability feature is a probability that the second translation model predicts the target corpus as the source corpus corresponding to the target corpus in the bilingual corpora.

In an embodiment, the language model includes a first language model and a second language model, and each of the feature vectors includes a first feature vector and a second feature vector. That the feature vectors of each pair of bilingual corpora are obtained and the second feature of each pair of bilingual corpora is determined based on the trained language model, includes: for each pair of the bilingual corpora, obtaining the first feature vector corresponding to the source corpus by in inputting the source corpus in the pair of bilingual corpora to a trained first language model; obtaining the second feature vector corresponding to the target corpus by inputting the target corpus in the pair of bilingual corpora to a trained second language model; and determining a semantic similarity between the source corpus and the target corpus in the pair of bilingual corpora as the second feature of the pair of bilingual corpora based on the first feature vector and the second feature vector.

In an embodiment, the first language model includes a first encoder obtained by training the source corpora in each pair of bilingual corpora, and the second language model includes a second encoder obtained by training the target corpora in each pair of bilingual corpora. For example, each of the first encoder and the second encoder is any one of an autoencoder, a variational autoencoder, and a noise-reduction autoencoder.

In an embodiment, a model parameter with which the first encoder encodes the source corpora is the same as a model parameter with which the second encoder encodes the target corpora.

In an embodiment, the semantic similarity is a Manhattan distance, a Euclidean distance, or a cosine similarity.

In an embodiment, that the quality value of each pair of bilingual corpora is determined according to the first feature and the second feature of each pair of bilingual corpora includes: performing a weighted calculation on the first feature and the second feature of each pair of bilingual corpora to obtain the quality value of each pair of bilingual corpora.

In an embodiment, that each pair of bilingual corpora is screened according to the quality value of each pair of bilingual corpora includes: ranking each pair of bilingual corpora according to the quality value of each pair of bilingual corpora; and screening each pair of bilingual corpora according to a ranking result.

In the bilingual corpora screening method provided by the embodiments of the present disclosure, first, multiple pairs of bilingual corpora are acquired, with each pair of the bilingual corpora including a source corpus and a target corpus; a machine translation model is trained based on the multiple pairs of bilingual corpora; a first feature of each pair of bilingual corpora is obtained based on the trained machine translation model; a language model is trained based on the multiple pairs of bilingual corpora; feature vectors of each pair of bilingual corpora are obtained and a second feature of each pair of bilingual corpora is determined based on the trained language model; then a quality value of each pair of bilingual corpora is determined according to the first feature and the second feature of each pair of bilingual corpora; and finally, each pair of bilingual corpora is screened according to the quality value of each pair of bilingual corpora. With the above method, the features of each pair of bilingual corpora are acquired, the quality values of different pairs are comprehensively determined based on the features, and the bilingual corpora are screened according to the quality values. The bilingual corpora screening method is applicable to various pairs of bilingual corpora, and can avoid the problem of inability to filter and screen some bilingual corpora, increase the data volume of cleaning corpora, and improve the efficiency in bilingual corpora cleaning.

Figure 3:
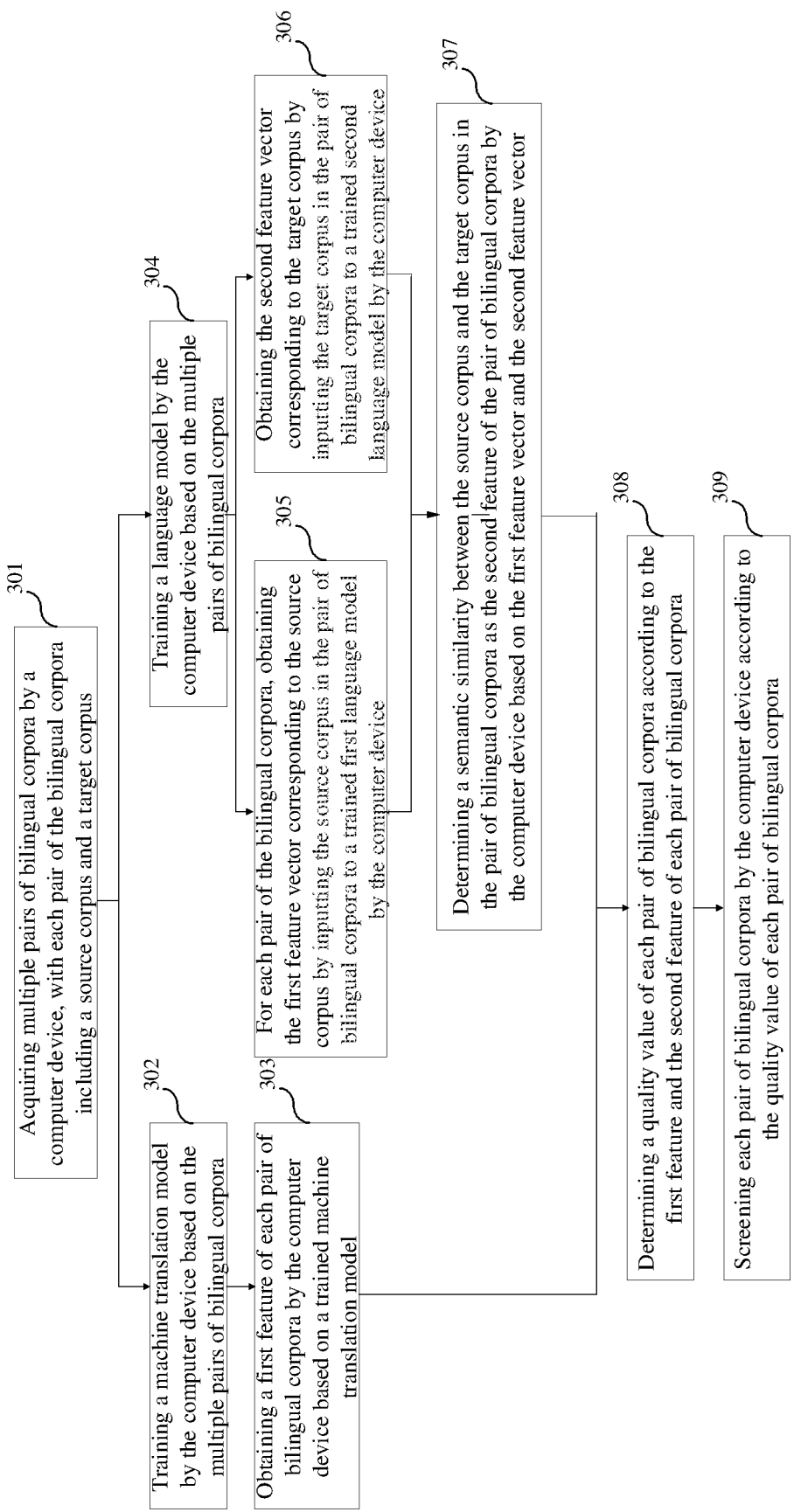
FIG. 3 shows a flowchart of a bilingual corpora screening method according to an exemplary embodiment.

FIG. 3 shows a flowchart of a bilingual corpora screening method according to an exemplary embodiment. The bilingual corpora screening method may be applied to a computer device. As shown in FIG. 3, the bilingual corpora screening method may include the following steps.

In step 301, multiple pairs of bilingual corpora are acquired by the computer device, with each pair of the bilingual corpora including a source corpus and a target corpus.

In an embodiment, the computer device acquires several pairs of bilingual corpora from the corpus base, with each pair of the bilingual corpora including a source corpus and a target corpus. The source corpus may be input to the machine translation model to obtain the target corpus through output. There is no fixed language type for the source corpus and the target corpus. For different machine translation models, the source corpus and target corpus in the same pair of bilingual corpora may be different.

For example, if a pair of bilingual corpora consists of a Chinese corpus and an English corpus, then for a machine translation model specific to Chinese-to-English translation, the Chinese corpus in the pair of bilingual corpora is the source corpus, and the English corpus therein is the target corpus. If this pair of bilingual corpora is applied to a machine translation model specific to English-to-Chinese translation, then the English corpus in this pair of bilingual corpora is the source corpus, and the Chinese corpus is the target corpus.

In step 302, a machine translation model is trained by the computer device based on the multiple pairs of bilingual corpora.

In an embodiment, the computer device may obtain a neural network model based on any one of RNN, CNN, or TRANSFORMER model as the machine translation model, and train the machine translation model by inputting several pairs of bilingual corpora obtained from the corpus base, thereby obtaining a trained machine translation model after the machine translation model is trained with each pair of bilingual corpora. The machine translation model corresponds to the bilingual corpora in terms of language type, and after training, a machine translation model for translating the source corpus into the target corpus can be obtained.

For example, in case that the bilingual corpora include a Chinese corpus and an English corpus, when the Chinese corpus used as the source corpus and the English corpus used as the target corpus, a Chinese-to-English machine translation model may be obtained via training by inputting the several pairs of bilingual corpora to the neural network model based on the aforementioned architecture. When the English corpus is used as the source corpus and the Chinese corpus is used as the target corpus, an English-to-Chinese machine translation model may be obtained via training by inputting the several pairs of bilingual corpora to the neural network model based on the aforementioned architecture.

In an embodiment, the multiple pairs of bilingual corpora may be all or some of pairs of bilingual corpora in a bilingual corpus base. The computer device may call the existing bilingual corpora in the bilingual corpora base to train the neural network model, and a training result of the machine translation model may be determined by the quality and quantity of the respective pairs of bilingual corpora called by the training model.

In step 303, a first feature of each pair of bilingual corpora is obtained by the computer device based on a trained machine translation model.

In an embodiment, the computer device inputs each pair of bilingual corpora, for which bilingual corpora screening is required, into the trained machine translation model, and obtains the first feature of each pair of bilingual corpora through the machine translation model. For example, the machine translation model includes a first translation model and a second translation model, and each first feature includes a first probability feature and a second probability feature. The first translation model is a machine translation model for translating the source corpora into the target corpora in each pair of bilingual corpora, and the second translation model is a machine translation model for translating the target corpora into the source corpora in each pair of bilingual corpora. In addition, each of the first feature may include the first probability feature obtained by the first translation model and the second probability feature obtained by the second translation model.

The method for obtaining the first probability feature may include: inputting the source corpus in each pair of the bilingual corpora to a trained first translation model, and determining the first probability feature of the bilingual corpora based on a result output by the first translation model. The first probability feature is a probability that the first translation model predicts the source corpus as the target corpus corresponding to the source corpus in the bilingual corpora.

The method for obtaining the second probability feature may include: inputting the target corpus in each pair of the bilingual corpora to a trained second translation model, and determining the second probability feature of the bilingual corpora based on a result output by the second translation model. The second probability feature is a probability that the second translation model predicts the target corpus as the source corpus corresponding to the target corpus in the bilingual corpora.

The probability of predicting the source corpus as the target corpus corresponding to the source corpus in the bilingual corpus and the probability of predicting the target corpus as the source corpus corresponding to the target corpus in the bilingual corpus are calculated by the machine translation model; and the probability of mutual translation between the source corpus and the target corpus in the bilingual corpora can be calculated in a conditional probability mode.

For example, a pair of bilingual corpora includes a corpus A and a corpus B, respectively, and the corpus A and the corpus B may be translated mutually. When the corpus A is translated into the corpus B through the machine translation model, the probability P(B|A) of translating into the corpus B may be obtained as a probability feature. When the corpus B is translated into the corpus A through the machine translation model, the probability P(A|B) of translating into the corpus A may be obtained as another probability feature. These two probability features act as the first feature of the pair of bilingual corpora.

In step 304, a language model is trained by the computer device based on the multiple pairs of bilingual corpora.

In an embodiment, the computer device builds a language model, and trains the language model by inputting the respective corpora from multiple pairs of bilingual corpora to obtain a trained language model.

In an embodiment, the computer device may train the language model by adding an encoder to the language model. The encoder may be any one of an autoencoder, a variational autoencoder, and a noise-reduction autoencoder.

Figure 4:
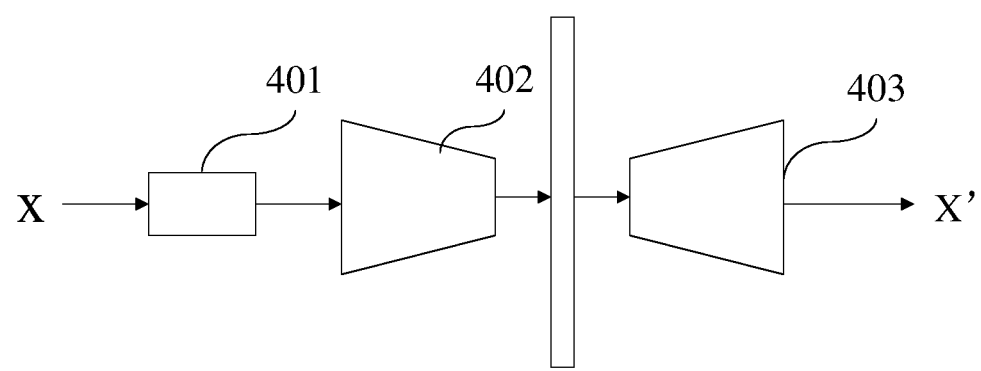
FIG. 4 is a schematic diagram of a noise-reduction autoencoder according to an exemplary embodiment.

FIG. 4 is a schematic diagram of a noise-reduction autoencoder according to an exemplary embodiment. As shown in FIG. 4, when the language model is trained with the noise-reduction autoencoder, a corpus x is first obtained from the bilingual corpora; the corpus x is added with noise by a noise module 401 to obtain a noise-added corpus C(x) from the corpus x; then, the C(x) is input to an encoder 402 to obtain a feature vector Z, which is then input to a decoder 403 and decoded to obtain a newly generated corpus x'.

If the corpus x is a sentence, noise addition process may be deleting a word in the corpus x according to a probability or to disorganizing the order of the words therein to some extent.

For example, when the corpus x is a Chinese sentence "今天是一个好日子" the noise addition may be deleting a word therein, thereby obtaining "今天是好日子" or "今天是 一个日子" or the like, or disorganizing the order of the words therein, thereby obtaining "是 一个好日子今天" or "今天好日子是一个"; then, the noise-added sentence is encoded to obtain a feature vector, which is then decoded to obtain a sentence; comparing the obtained sentence with the original sentence, the newly generated corpus x' is restored to the corpus x as much as possible by training the model.

In addition, the language model includes a first language model and a second language model, and each of the feature vectors includes a first feature vector and a second feature vector.

For a pair of bilingual corpora, which includes the source corpus and the target corpus, the first feature vector may be obtained by inputting the source corpus to the first language model, and the second feature vector may be obtained by inputting the target corpus to the second feature.

Referring back to FIG. 3, in step 305, for each pair of the bilingual corpora, the first feature vector corresponding to the source corpus is obtained by inputting the source corpus in the pair of bilingual corpora to a trained first language model by the computer device.

In an embodiment, the computer device inputs the source corpora in the respective pairs of bilingual corpora, that need to be screened, to the trained first language model, and may generate the feature vectors of the source corpora through the first encoder, thereby acquiring the feature vectors as the first feature vectors corresponding to the source corpora. For example, the first language model includes a first encoder obtained by training the source corpora in the respective pairs of bilingual corpora, and the first encoder is any one of an autoencoder, a variational autoencoder, and a noise-reduction autoencoder.

In step 306, the second feature vector corresponding to the target corpus is obtained by inputting the target corpus in the pair of bilingual corpora to a trained second language model by the computer device.

In an embodiment, the computer device inputs the target corpora in the respective pairs of bilingual corpora, that need to be screened, to the trained second language model, and may generate the feature vectors of the target corpora through the second encoder, thereby acquiring the feature vectors as the second feature vectors corresponding to the target corpora. For example, the second language model includes a second encoder obtained by training the target corpora in the respective pairs of bilingual corpora, and the second encoder is any one of an autoencoder, a variational autoencoder, and a noise-reduction autoencoder.

In step 307, a semantic similarity between the source corpus and the target corpus in the pair of bilingual corpora is determined as the second feature of the pair of bilingual corpora by the computer device based on the first feature vector and the second feature vector.

In an embodiment, the computer device obtains the feature vectors of each pair of bilingual corpora and determines a second feature of each pair of bilingual corpora, based on the trained language model. For example, the semantic similarity is a Manhattan distance, a Euclidean distance, or a cosine similarity, The Manhattan distance, the Euclidean distance, and the cosine similarity are all methods for calculating the similarity.

In an embodiment, the model parameters of the first encoder and the second encoder are the same, and the model parameters are parameters with which the first encoder encodes the source corpora and parameters with which the second encoder encodes the target corpora.

In an embodiment, since the model parameters of the first encoder and the second encoder are the same, the first language model and the second language model are in the same semantic space, so that the first language model and the second language model may be the same language model.

For example, when the first language model and the second language model are the same language model, the feature vector of the source corpus is generated by inputting the source corpus, and the feature vector of the target corpus is generated by inputting the target corpus.

In an embodiment, the semantic similarity between the source corpus and the target corpus in the bilingual corpora may be calculated by the following calculation formula:

$$Sim(Z_x, Z_y) = \frac{Z_x \cdot Z_y}{|Z_x| \cdot |Z_y|}.$$

$Z_x$ represents the feature vector of the source corpus, and $Z_y$ represents the feature vector of the target corpus. A result from the semantic similarity calculation is the second feature of the bilingual corpora pair corresponding to the source corpus and the target corpus.

In step 308, a quality value of each pair of bilingual corpora is determined by the computer device according to the first feature and the second feature of each pair of bilingual corpora.

In an embodiment, the computer device obtains the quality value of each pair of bilingual corpora by calculating the probability features of the source corpora, the probability features of the target corpora, and the semantic similarity feature of the feature vectors between the source corpora and the target corpora, in each pair of bilingual corpora.

In an embodiment, a weighted calculation is performed on the first feature and the second feature of each pair of bilingual corpora to obtain the quality value of each pair of bilingual corpora. For example, the weighted calculation may be performed by defining the weight ratio of each feature by a user, or based on average weight, that is, the weights of the first feature and the second feature of each pair of bilingual corpora are the same. Also for example, the quality value of each pair of bilingual corpora is proportional to the quality of each pair of bilingual corpora.

In step 309, each pair of bilingual corpora is screened by the computer device according to the quality value of each pair of bilingual corpora.

In an embodiment, the computer device acquires the quality value of each pair of bilingual corpora, and may screen each pair of bilingual corpora corresponding to the respective quality values by analyzing the respective quality values.

In an embodiment, screening the respective bilingual corpora by the computer device may include deleting the pairs of bilingual corpora whose quality values do not satisfy a preset rule.

In an embodiment, the method for screening the bilingual corpora according to the quality values may be that the computer device ranks each pair of bilingual corpora according to the quality value of each pair of bilingual corpora, and then screens each pair of bilingual corpora according to a ranking result.

For example, the computer device obtains the quality values by performing calculation on all the pairs of bilingual corpora that need to be screened, and then ranks all the pairs of bilingual corpora in a descending order of their quality values. A user sets a fixed ratio, for example, ⅓, and the bilingual corpora ranking ⅓ top positions based on their quality values do not need to be deleted.

In an embodiment, the method for screening the bilingual corpora according to the quality values may also be that the computer device sets a threshold, determines to delete the bilingual corpora when the quality values of the bilingual corpora are less than the set threshold, and determines to maintain the bilingual corpora when the quality values of the bilingual corpora are greater than the set threshold.

In the bilingual corpora screening method provided by the embodiments of the present disclosure, first, multiple pairs of bilingual corpora are acquired, with each pair of the bilingual corpora including a source corpus and a target corpus; a machine translation model is trained based on the multiple pairs of bilingual corpora; a first feature of each pair of bilingual corpora is obtained based on the trained machine translation model; a language model is trained based on the multiple pairs of bilingual corpora; feature vectors of each pair of bilingual corpora are obtained and a second feature of each pair of bilingual corpora is determined based on the trained language model; then a quality value of each pair of bilingual corpora are determined according to the first feature and the second feature of each pair of bilingual corpora and finally, each pair of bilingual corpora is screened according to the quality value of each pair of bilingual corpora. With the above method, the features of each pair of bilingual corpora are acquired, the quality values of different pairs are comprehensively determined based on the respective features, and the bilingual corpora are screened according to the quality values. The bilingual corpora screening method is applicable to various pairs of bilingual corpora, and can avoid the problem of inability to filter and screen some bilingual corpora, increase the data volume of cleaning corpora, and improve the efficiency in bilingual corpora cleaning.

Figure 5:
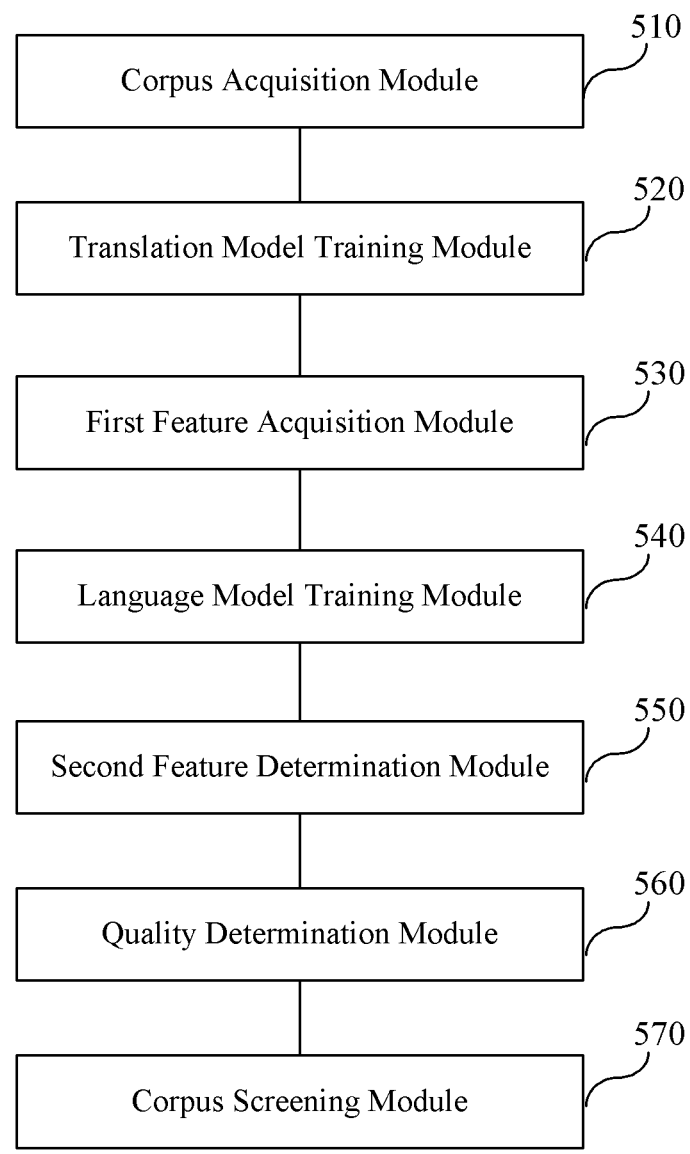
FIG. 5 shows a block diagram of a bilingual corpora screening apparatus according to an exemplary embodiment.

FIG. 5 shows a block diagram of a bilingual corpora screening apparatus according to an exemplary embodiment. As shown in FIG. 5, the bilingual corpora screening apparatus may be implemented as all or part of a computer device by hardware, or software, or a combination of software and hardware, to perform the steps shown in any of the embodiments shown in FIG. 2 or FIG. 3.

The bilingual corpora screening apparatus may include: a corpus acquisition module 510 configured to acquire multiple pairs of bilingual corpora, with each pair of the bilingual corpora including a source corpus and a target corpus; a translation model training module 520 configured to train a machine translation model based on the multiple pairs of bilingual corpora; and a first feature acquisition module 530 configured to obtain a first feature of each pair of bilingual corpora based on a trained machine translation model. The bilingual corpora screening apparatus may also include: a language model training module 540 configured to train a language model based on the multiple pairs of bilingual corpora; a second feature determination module 550 configured to obtain feature vectors of each pair of bilingual corpora and determine a second feature of each pair of bilingual corpora, based on a trained language model; a quality determination module 560 configured to determine a quality value of each pairs of bilingual corpora according to the first feature and the second feature of each pair of bilingual corpora; and a corpus screening module 570 configured to screen each pair of bilingual corpora according to the quality value of each pair of bilingual corpora.

In an embodiment, the machine translation model includes a first translation model and a second translation model, and each of the first feature includes a first probability feature and a second probability feature. The first feature acquisition module 530 includes: a first probability determination sub-module configured to input the source corpus in each pair of the bilingual corpora to a trained first translation model, and determine the first probability feature of the bilingual corpora based on a result output by the first translation model, wherein the first probability feature is a probability that the first translation model predicts the source corpus as the target corpus corresponding to the source corpus in the bilingual corpora; and a second probability determination sub-module configured to input the target corpus in each pair of the bilingual corpora to a trained second translation model, and determine the second probability feature of the bilingual corpora based on a result output by the second translation model, wherein the second probability feature is a probability that the second translation model predicts the target corpus as the source corpus corresponding to the target corpus in the bilingual corpora.

In an embodiment, the language model includes a first language model and a second language model, and each of the feature vectors includes a first feature vector and a second feature vector. The second feature determination module 530 includes: a first vector acquisition sub-module configured to, for each pair of the bilingual corpora, obtain the first feature vector corresponding to the source corpus by inputting the source corpus in the pair of bilingual corpora to a trained first language model; a second vector acquisition sub-module configured to obtain the second feature vector corresponding to the target corpus by inputting the target corpus in the pair of bilingual corpora to a trained second language model; and a second feature determination sub-module configured to determine a semantic similarity between the source corpus and the target corpus in the pair of bilingual corpora as the second feature of the pair of bilingual corpora, based on the first feature vector and the second feature vector.

In an embodiment, the first language model includes a first encoder obtained by training source corpora in each pair of bilingual corpora, and the second language model includes a second encoder obtained by training target corpora in each pair of bilingual corpora. For example, each of the first encoder and the second encoder is any one of an autoencoder, a variational autoencoder, and a noise-reduction autoencoder.

In an embodiment, a model parameter with which the first encoder encodes the source corpora is the same as a model parameter with which the second encoder encodes the target corpora.

In an embodiment, the semantic similarity is a Manhattan distance, a Euclidean distance, or a cosine similarity.

In an embodiment, the quality determination module 560 includes: a quality determination sub-module configured to perform a weighted calculation on the first feature and the second feature of each pair of bilingual corpora to obtain the quality value of each pair of bilingual corpora.

In an embodiment, the corpus screening module 570 includes: a corpus ranking sub-module configured to rank each pair of bilingual corpora according to the quality value of each pair of bilingual corpora; and a corpus screening sub-module configured to screen each pair of bilingual corpora according to a ranking result.

It should be noted that the apparatus provided by the embodiments above is only exemplary. In practice, the above functions can be finished by different functional modules as required.

With respect to the apparatus in the embodiments above, specific manners of respective modules to execute the operations have been described in detail in the method embodiments, which will not be repeated here.

Exemplary embodiments of the present disclosure also provide a bilingual corpora screening apparatus, which includes: a processor, and a memory for storing instructions executable by the processor. The processor is configured to: acquire multiple pairs of bilingual corpora, wherein each pair of the bilingual corpora includes a source corpus and a target corpus; train a machine translation model based on the multiple pairs of bilingual corpora; obtain a first feature of each pair of bilingual corpora based on a trained machine translation model; train a language model based on the multiple pairs of bilingual corpora; obtain feature vectors of each pair of bilingual corpora and determine a second feature of each pair of bilingual corpora, based on a trained language model; determine a quality value of each pair of bilingual corpora according to the first feature and the second feature of each pair of bilingual corpora; and screen each pair of bilingual corpora according to the quality value of each pair of bilingual corpora.

In an embodiment, the machine translation model includes a first translation model and a second translation model, and each first feature includes a first probability feature and a second probability feature. That the first feature of each pair of bilingual corpora is obtained based on the trained machine translation model includes: inputting the source corpus in each pair of the bilingual corpora to a trained first translation model, and determining the first probability feature of the bilingual corpora based on a result output by the first translation model, wherein the first probability feature is a probability that the first translation model predicts the source corpus as the target corpus corresponding to the source corpus in the bilingual corpora; and inputting the target corpus in each pair of the bilingual corpora to a trained second translation model, and determining the second probability feature of the bilingual corpora based on a result output by the second translation model, wherein the second probability feature is a probability that the second translation model predicts the target corpus as the source corpus corresponding to the target corpus in the bilingual corpora.

In an embodiment, the language model includes a first language model and a second language model, and each of the feature vectors includes a first feature vector and a second feature vector. That the feature vectors of each pair of bilingual corpora are obtained and the second feature of each pair of bilingual corpora is determined based on the trained language model, includes: for each pair of the bilingual corpora, obtaining the first feature vector corresponding to the source corpus by inputting the source corpus in the pair of bilingual corpora to a trained first language model; obtaining the second feature vector corresponding to the target corpus by inputting the target corpus in the pair of bilingual corpora to a trained second language model; and determining a semantic similarity between the source corpus and the target corpus in the pair of bilingual corpora as the second feature of the pair of bilingual corpora based on the first feature vector and the second feature vector.

In an embodiment, the first language model includes a first encoder obtained by training the source corpora in each pair of bilingual corpora, and the second language model includes a second encoder obtained by training the target corpora in each pair of bilingual corpora. For example, each of the first encoder and the second encoder is any one of an autoencoder, a variational autoencoder, and a noise-reduction autoencoder.

In an embodiment, a model parameter with which the first encoder encodes the source corpora is the same as a model parameter with which the second encoder encodes the target corpora.

In an embodiment, the semantic similarity is a Manhattan distance, a Euclidean distance, or a cosine similarity.

In an embodiment, that the quality value of each pair of bilingual corpora is determined according to the first feature and the second feature of each pair of bilingual corpora includes: performing a weighted calculation on the first feature and the second feature of each pair of bilingual corpora to obtain the quality value of each pair of bilingual corpora.

In an embodiment, that each pair of bilingual corpora is screened according to the value of each pair of bilingual corpora includes: ranking each pair of bilingual corpora according to the quality value of each pair of bilingual corpora; and screening each pair of bilingual corpora according to a ranking result.

Figure 6:
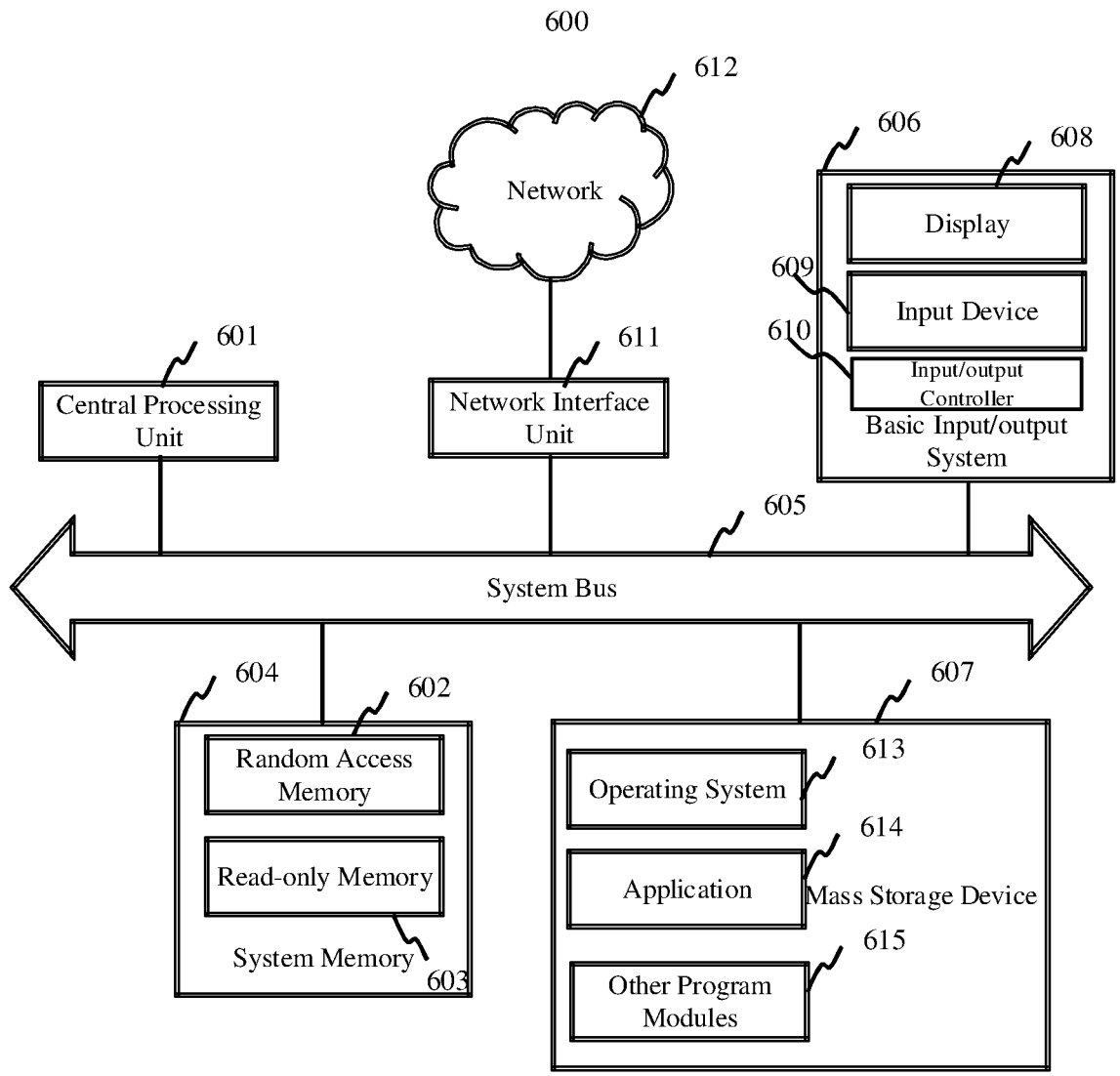
FIG. 6 shows a schematic structural diagram of a computer device according to an exemplary embodiment.

FIG. 6 is a schematic diagram of a computer device 600 according to an exemplary embodiment. The computer device 600 includes a central processing unit (CPU) 601, a system memory 604 including a random access memory (RAM) 602 and a read-only memory (ROM) 603, and a system bus 605 connecting the system memory 604 and the CPU 601. The computer device 600 further includes a basic input/output system (I/O system) 606 which helps transmit information between various components within a computer, and a mass storage device 607 for storing an operating system 613, an application 614 and other program modules 615.

The basic I/O system 606 includes a display 608 for displaying information and an input device 609, such as a mouse and a keyboard, for a user to input the information. The display 608 and the input device 609 are both connected to the CPU 601 by an I/O controller 610 connected to the system bus 605. The basic I/O system 606 may also include the I/O controller 610 for receiving and processing input from a plurality of other devices, such as a keyboard, a mouse and an electronic stylus. Similarly, the I/O controller 610 further provides output to a display screen, a printer or other types of output devices.

The mass storage device 607 is connected to the CPU 601 by a high-capacity storage controller (not shown) connected to the system bus 605. The mass storage device 607 and its associated computer-readable medium provide non-volatile storage for the computer device 600. That is, the mass storage device 607 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an EPROM, an EEPROM, a flash memory or other solid-state storage technologies; a CD-ROM. DVD or other optical storage; and a tape cartridge, a magnetic tape, a disk storage or other magnetic storage devices. Of course, it will be known by a person skilled in the art that the computer storage medium is not limited to above. The above system memory 604 and the mass storage device 607 may be collectively referred to as the memory.

According to various embodiments of the present disclosure, the computer device 600 may also be connected to a remote computer on a network through the network, such as the Internet, for operation. That is, the computer device 600 may be connected to a network 612 through a network interface unit 611 connected to the system bus 605, or may be connected to other types of networks or remote computer systems (not shown) with the network interface unit 611.

The memory further includes one or more programs stored in the memory. The CPU 601 implements all or part of the steps of the method shown in FIG. 2 or FIG. 3 by executing the one or more programs.

Those skilled in the art will appreciate that in one or more examples described above, the functions described in the embodiments of the present disclosure can be implemented in hardware, software, firmware, or any combination thereof. When implemented in software, the functions may be stored in a computer-readable medium or transmitted as one or more instructions or codes on the computer-readable medium. The computer-readable medium includes both a computer storage medium and a communication medium including any medium that facilitates transfer of a computer program from one location to another. The storage medium may be any available medium that can be accessed by a general-purpose or special-purpose computer.

According to an embodiment of the present disclosure, there is also provided a computer device storage medium for storing computer device software instructions used in the above apparatus. The computer device storage medium includes a program designed for executing the bilingual corpora screening method described above.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

The invention claimed is:

1. A bilingual corpora screening method, comprising:
acquiring multiple pairs of bilingual corpora, wherein each pair of the bilingual corpora comprises a source corpus and a target corpus;
training a machine translation model based on the multiple pairs of bilingual corpora;
obtaining a first feature of each pair of bilingual corpora based on the trained machine translation model;
training a language model with a noise-reduction autoencoder based on the multiple pairs of bilingual corpora, wherein the training the language model comprises: obtaining a corpus from the multiple pairs of bilingual corpora; adding the corpus with noise to obtain a noise-added corpus; inputting the noise-added corpus to an encoder to obtain a feature vector; and inputting the feature vector to a decoder for decoding to obtain a newly generated corpus;

obtaining feature vectors of each pair of bilingual corpora and determining a second feature of each pair of bilingual corpora based on the trained language model;

determining a quality value of each pair of bilingual corpora according to the first feature and the second feature of each pair of bilingual corpora; and screening each pair of bilingual corpora according to the quality value of each pair of bilingual corpora.

2. The method according to claim 1, wherein the machine translation model comprises a first translation model and a second translation model, and each first feature comprises a first probability feature and a second probability feature; and obtaining the first feature of each pair of bilingual corpora based on the trained machine translation model comprises:

inputting the source corpus in each pair of the bilingual corpora to a trained first translation model, and determining the first probability feature of the bilingual corpora based on a result output by the trained first translation model, wherein the first probability feature is a probability that the trained first translation model predicts the source corpus as the target corpus corresponding to the source corpus in the bilingual corpora, and inputting the target corpus in each pair of the bilingual corpora to a trained second translation model, and determining the second probability feature of the bilingual corpora based on a result output by the trained second translation model, wherein the second probability feature is a probability that the trained second translation model predicts the target corpus as the source corpus corresponding to the target corpus in the bilingual corpora.

3. The method according to claim 1, wherein the language model comprises a first language model and a second language model, and each of the feature vectors comprises a first feature vector and a second feature vector; and obtaining the feature vectors of each pair of bilingual corpora and determining the second feature of each pair of bilingual corpora based on the trained language model, comprises:

for each pair of the bilingual corpora, obtaining the first feature vector corresponding to the source corpus by inputting the source corpus in the pair of bilingual corpora to a trained first language model, obtaining the second feature vector corresponding to the target corpus by inputting the target corpus in the pair of bilingual corpora to a trained second language model, and determining a semantic similarity between the source corpus and the target corpus in the pair of bilingual corpora as the second feature of the pair of bilingual corpora based on the first feature vector and the second feature vector.

4. The method according to claim 3, wherein the first language model comprises a first encoder obtained by training the source corpora in each pair of bilingual corpora, and the second language model comprises a second encoder obtained by training the target corpora in each pair of bilingual corpora, wherein each of the first encoder and the second encoder is a noise-reduction autoencoder.

5. The method according to claim 4, wherein a model parameter with which the first encoder encodes the source corpora is the same as a model parameter with which the second encoder encodes the target corpora.

6. The method according to claim 3, wherein the semantic similarity is one of a Manhattan distance, a Euclidean distance, or a cosine similarity.

7. The method according to claim 1, wherein determining the quality value of each pair of bilingual corpora according to the first feature and the second feature of each pair of bilingual corpora comprises:

performing a weighted calculation on the first feature and the second feature of each pair of bilingual corpora to obtain the quality value of each pair of bilingual corpora.

8. The method according to claim 1, wherein screening each pair of bilingual corpora according to the quality value of each pair of bilingual corpora comprises:

ranking each pair of bilingual corpora according to the quality value of each pair of bilingual corpora; and screening each pair of bilingual corpora according to a ranking result.

9. A bilingual corpora screening apparatus, comprising:

a processor; and a memory storing instructions executable by the processor, wherein the processor is configured to:

acquire multiple pairs of bilingual corpora, wherein each pair of the bilingual corpora comprises a source corpus and a target corpus;

train a machine translation model with a noise-reduction autoencoder based on the multiple pairs of bilingual corpora, wherein training the language model comprises: obtaining a corpus from the multiple pairs of bilingual corpora; adding the corpus with noise to obtain a noise-added corpus; inputting the noise-added corpus to an encoder to obtain a feature vector; and inputting the feature vector to a decoder for decoding to obtain a newly generated corpus;

obtain a first feature of each pair of bilingual corpora based on the trained machine translation model;

train a language model based on the multiple pairs of bilingual corpora;

obtain feature vectors of each pair of bilingual corpora and determine a second feature of each pair of bilingual corpora based on the trained language model;

determine a quality value of each pair of bilingual corpora according to the first feature and the second feature of each pair of bilingual corpora; and screen each pair of bilingual corpora according to the quality value of each pair of bilingual corpora.

10. The apparatus according to claim 9, wherein the machine translation model comprises a first translation model and a second translation model, and each first feature comprises a first probability feature and a second probability feature; and the processor is further configured to:

input the source corpus in each pair of the bilingual corpora to a trained first translation model, and determine the first probability feature of the bilingual corpora based on a result output by the trained first translation model, wherein the first probability feature is a probability that the trained first translation model predicts the source corpus as the target corpus corresponding to the source corpus in the bilingual corpora, and input the target corpus in each pair of the bilingual corpora to a trained second translation model, and determine the second probability feature of the bilingual corpora based on a result output by the trained second translation model, wherein the second probability feature is a probability that the trained second translation model predicts the target corpus as the source corpus corresponding to the target corpus in the bilingual corpora.

11. The apparatus according to claim 9, wherein the language model comprises a first language model and a second language model, and each of the feature vectors comprises a first feature vector and a second feature vector; and the processor is further configured to:
for each pair of the bilingual corpora, obtain the first feature vector corresponding to the source corpus by inputting the source corpus in the pair of bilingual corpora to a trained first language model,
obtain the second feature vector corresponding to the target corpus by inputting the target corpus in the pair of bilingual corpora to a trained second language model, and
determine a semantic similarity between the source corpus and the target corpus in the pair of bilingual corpora as the second feature of the pair of bilingual corpora based on the first feature vector and the second feature vector.

12. The apparatus according to claim 11, wherein the first language model comprises a first encoder obtained by training source corpora in each pair of bilingual corpora, and the second language model comprises a second encoder obtained by training target corpora in each pair of bilingual corpora,
wherein each of the first encoder and the second encoder is a noise-reduction autoencoder.

13. The apparatus according to claim 12, wherein a model parameter with which the first encoder encodes the source corpora is the same as a model parameter with which the second encoder encodes the target corpora.

14. The apparatus according to claim 11, wherein the semantic similarity is one of a Manhattan distance, a Euclidean distance, or a cosine similarity.

15. The apparatus according to claim 9, wherein the processor is further configured to:
perform a weighted calculation on the first feature and the second feature of each pair of bilingual corpora to obtain the quality value of each pair of bilingual corpora.

16. The apparatus according to claim 9, wherein the processor is further configured to:
rank each pair of bilingual corpora according to the quality value of each pair of bilingual corpora; and
screen each pair of bilingual corpora according to a ranking result.

17. A non-transitory computer-readable storage medium having stored therein instructions that, when executed by a processor of a device, cause the device to perform a bilingual corpora screening method, the method comprising:
acquiring multiple pairs of bilingual corpora, wherein each pair of the bilingual corpora comprises a source corpus and a target corpus;
training a machine translation model based on the multiple pairs of bilingual corpora;
obtaining a first feature of each pair of bilingual corpora based on the trained machine translation model;
training a language model with a noise-reduction autoencoder based on the multiple pairs of bilingual corpora, wherein the training the language model comprises:
obtaining a corpus from the multiple pairs of bilingual corpora; adding the corpus with noise to obtain a noise-added corpus; inputting the noise-added corpus to an encoder to obtain a feature vector; and inputting the feature vector to a decoder for decoding to obtain a newly generated corpus;
obtaining feature vectors of each pair of bilingual corpora and determining a second feature of each pair of bilingual corpora based on the trained language model;
determining a quality value of each pair of bilingual corpora according to the first feature and the second feature of each pair of bilingual corpora; and
screening each pair of bilingual corpora according to the quality value of each pair of bilingual corpora.

18. The non-transitory computer-readable storage medium according to claim 17, wherein the machine translation model comprises a first translation model and a second translation model, and each first feature comprises a first probability feature and a second probability feature; and
obtaining the first feature of each pair of bilingual corpora based on the trained machine translation model comprises:
inputting the source corpus in each pair of the bilingual corpora to a trained first translation model, and determining the first probability feature of the bilingual corpora based on a result output by the trained first translation model, wherein the first probability feature is a probability that the trained first translation model predicts the source corpus as the target corpus corresponding to the source corpus in the bilingual corpora, and
inputting the target corpus in each pair of the bilingual corpora to a trained second translation model, and determining the second probability feature of the bilingual corpora based on a result output by the trained second translation model, wherein the second probability feature is a probability that the trained second translation model predicts the target corpus as the source corpus corresponding to the target corpus in the bilingual corpora.

19. The non-transitory computer-readable storage medium according to claim 17, wherein the language model comprises a first language model and a second language model, and each of the feature vectors comprises a first feature vector and a second feature vector; and
obtaining the feature vectors of each pair of bilingual corpora and determining the second feature of each pair of bilingual corpora based on the trained language model, comprises:
for each pair of the bilingual corpora, obtaining the first feature vector corresponding to the source corpus by inputting the source corpus in the pair of bilingual corpora to a trained first language model,
obtaining the second feature vector corresponding to the target corpus by inputting the target corpus in the pair of bilingual corpora to a trained second language model, and
determining a semantic similarity between the source corpus and the target corpus in the pair of bilingual corpora as the second feature of the pair of bilingual corpora based on the first feature vector and the second feature vector.

20. The non-transitory computer-readable storage medium according to claim 17, wherein determining the quality value of each pair of bilingual corpora according to the first feature and the second feature of each pair of bilingual corpora comprises:

performing a weighted calculation on the first feature and the second feature of each pair of bilingual corpora to obtain the quality value of each pair of bilingual corpora.

* * * * *